US011027696B2

(12) United States Patent
Abro

(10) Patent No.: US 11,027,696 B2
(45) Date of Patent: Jun. 8, 2021

(54) VEHICLE SEAT BELT SYSTEMS

(71) Applicant: Toyota Motor Engineering & Manufacturing North America, Inc., Plano, TX (US)

(72) Inventor: Lauren Abro, West Bloomfield, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 155 days.

(21) Appl. No.: 16/386,805

(22) Filed: Apr. 17, 2019

(65) Prior Publication Data
US 2020/0331427 A1 Oct. 22, 2020

(51) Int. Cl.
*B60R 22/48* (2006.01)
*B60R 22/20* (2006.01)
*B60R 22/18* (2006.01)

(52) U.S. Cl.
CPC .............. *B60R 22/48* (2013.01); *B60R 22/20* (2013.01); *B60R 2022/1806* (2013.01); *B60R 2022/208* (2013.01); *B60R 2022/4816* (2013.01)

(58) Field of Classification Search
CPC ... B60R 22/48; B60R 22/20; B60R 2022/208; B60R 2022/1806; B60R 2022/4816
See application file for complete search history.

(56) References Cited

U.S. PATENT DOCUMENTS

| 5,152,552 | A | 10/1992 | Ikegaya | |
|---|---|---|---|---|
| 5,236,220 | A | 8/1993 | Mills | |
| 6,684,972 | B2 * | 2/2004 | Oyaski | B60K 28/063 180/268 |
| 7,584,997 | B2 | 9/2009 | Bachmann et al. | |
| 8,864,172 | B2 | 10/2014 | Yilma | |
| 10,471,930 | B2 * | 11/2019 | Thomas | B60R 22/48 |
| 10,569,738 | B2 * | 2/2020 | Thomas | B60R 22/18 |
| 2003/0200019 | A1 * | 10/2003 | Grabowski | B60R 22/03 701/45 |
| 2006/0125614 | A1 | 6/2006 | Hagenbuch | |

(Continued)

FOREIGN PATENT DOCUMENTS

| JP | 4300356 | 7/2009 |
|---|---|---|
| JP | 2010137641 | 6/2010 |
| KR | 100305928 | 9/2001 |

*Primary Examiner* — Darlene P Condra
(74) *Attorney, Agent, or Firm* — Dinsmore & Shohl LLP

(57) ABSTRACT

A vehicle seat belt system includes a retractable seat belt buckle, one or more buckle sensors, and a control unit. The control unit is communicatively coupled to the one or more buckle sensors and one or more drive systems of a vehicle. The retractable seat belt buckle is movable between an extended position and a retracted position. The one or more buckle sensors are positioned to sense a position of the retractable seat belt buckle and output a signal indicative of the position of the retractable seat belt buckle. The control unit receives the signal from the one or more buckle sensors, determines the position of the retractable seat belt buckle based on the signal from the one or more buckle sensors, and transmits a stop signal to the one or more vehicle drive systems to cause the one or more vehicle drive systems to prevent motion of the vehicle when the retractable seat belt buckle is positioned in the extended position.

15 Claims, 2 Drawing Sheets

(56) References Cited

U.S. PATENT DOCUMENTS

| | | | |
|---|---|---|---|
| 2007/0216214 A1* | 9/2007 | Delventhal | B65H 75/48 297/478 |
| 2009/0020997 A1* | 1/2009 | Odate | B60R 22/46 280/801.1 |
| 2015/0251618 A1* | 9/2015 | Ghannam | B60R 22/48 340/457.1 |
| 2015/0283974 A1* | 10/2015 | Schlittenbauer | B60R 22/02 701/45 |
| 2019/0152418 A1* | 5/2019 | Coughlin | B60R 21/01566 |

* cited by examiner

VEHICLE SEAT BELT SYSTEMS

TECHNICAL FIELD

The present specification generally relates to seat belts systems and, more specifically, vehicle seat belt systems that include retractable seat belt buckles.

BACKGROUND

Seat belt buckles within a vehicle may be non-extendable while seat belt tongues may extend to engage with the seat belt buckle. In various instances, it may be difficult to reach the seat belt buckle to engage the seat belt when the seat belt buckle is out of reach or a passenger is blocking access to the seat belt buckle. For example, children often use booster seats when sitting within a vehicle. It may be difficult to the child and/or an adult strapping the child within the booster seat to reach the buckle to engage the seat belt tongue with the seat belt buckle. Additionally, where a seat belt buckle is extendable, it might not be apparent to a user or vehicle operator if the seat belt buckle has returned to the retracted position prior to operation of the vehicle.

SUMMARY

In one embodiment, a vehicle seat belt system includes a retractable seat belt buckle, one or more buckle sensors, and a control unit. The control unit is communicatively coupled to the one or more buckle sensors and one or more drive systems of a vehicle. The retractable seat belt buckle is movable between an extended position and a retracted position. The one or more buckle sensors are positioned to sense a position of the retractable seat belt buckle and output a signal indicative of the position of the retractable seat belt buckle. The control unit receives the signal from the one or more buckle sensors, determines the position of the retractable seat belt buckle based on the signal from the one or more buckle sensors, and transmits a stop signal to the one or more vehicle drive systems to cause the one or more vehicle drive systems to prevent motion of the vehicle when the retractable seat belt buckle is positioned in the extended position.

In another embodiment, a vehicle includes a vehicle seat, one or more vehicle drive systems, and a vehicle seat belt system. The vehicle seat belt system includes a retractable seat belt buckle, one or more buckle sensors, and a control unit. The control unit is communicatively coupled to the one or more buckle sensors and one or more drive systems of a vehicle. The retractable seat belt buckle is movable between an extended position and a retracted position. The one or more buckle sensors are positioned to sense a position of the retractable seat belt buckle and output a signal indicative of the position of the retractable seat belt buckle. The control unit receives the signal from the one or more buckle sensors, determines the position of the retractable seat belt buckle based on the signal from the one or more buckle sensors, and transmits a stop signal to the one or more vehicle drive systems to cause the one or more vehicle drive systems to prevent motion of the vehicle when the retractable seat belt buckle is positioned in the extended position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The figures generally depict a vehicle seat belt system according to various embodiments described herein. In general, vehicle seat belt systems according to the present disclosure include a retractable seat belt buckle movable between an extended position and a retracted position, one or more buckle sensors, and a control unit. The one or more buckle sensors may be communicatively coupled to the control unit. The one or more buckle sensors output a signal indicative of the position of the retractable seat belt buckle. Using this signal, the control unit may determine a position of the retractable seat belt buckle. When the retractable seat belt buckle is determined to be in the extended position by the control unit, the control unit may transmit a stop signal to the one or more vehicle drive system to cause the one or more vehicle drive systems to prevent motion of the vehicle when the retractable seat belt buckle is positioned in the extended position. For example, when the retractable seat belt buckle is in the extended position, the control unit may prevent the vehicle from being placed in a driving gear (e.g., forward, reverse, low, etc.). This may ensure that the retractable seat belt buckle is positioned within a proper traveling position prior to the vehicle moving. During vehicle crash testing, a seat belt buckle may be tested at a standard (lowered position). Safety data which correlates to the standard position may not necessarily correspond to other extended positions. Accordingly, traveling with the seat belt buckle in the proper traveling position may reduce performance variations during a collision from expected performance. Various embodiments of retractable seat belt systems and vehicles having a retractable seat belt system will be described in more detail herein.

Figure 1:
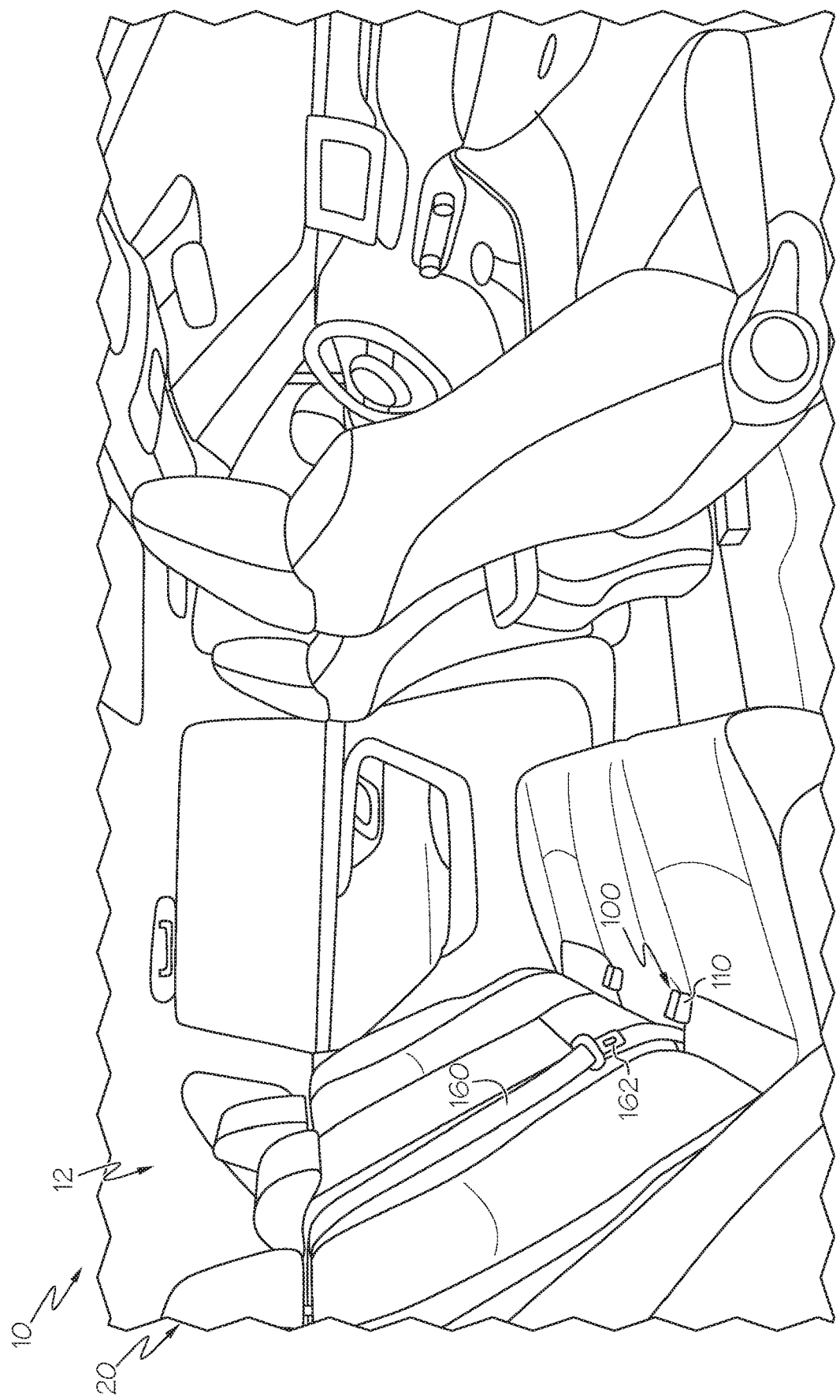
FIG. 1 depicts a perspective view of an interior of an illustrative vehicle according to one or more embodiments shown and described herein.

Referring now to FIG. 1, an interior 12 of a vehicle 10 is generally depicted. It is noted that while the vehicle 10 is depicted as an automobile. The vehicle 10 may include any terrestrial, aquatic, and/or airborne vehicle. The interior 12 of the vehicle 10 includes a vehicle seat 20. The vehicle 10 may include any number of vehicle seats. In some embodiments, the vehicle 10 may include a driver seat, a passenger seat, and one or more rear passenger seats. In some embodiments, the vehicle seats (e.g., the rear passenger seat) may include a bench seat.

A seat belt system 100 may be coupled to a vehicle seat 20. The vehicle seat belt system 100 includes a retractable seat belt buckle 110. In some embodiments, the vehicle seat belt system 100 further includes a seat belt strap 160 and a tongue 162 coupled to the strap 150. As should be generally understood, to secure a person or object within the vehicle seat 20, a user may pull the seat belt strap 160 and tongue 162 around their torso, and insert the tongue 162 into a corresponding seat belt buckle. As will be described in greater detail herein, to aid in inserting the tongue 162 into the designated seat belt buckle, the retractable seat belt buckle 110 may extend from a retracted (or base) position to an extended position that allows the retractable seat belt buckle 110 to extend vertically higher than when in the retracted position. Accordingly, a user may be allowed to more easily insert the tongue 162 into the retractable seat belt buckle 110.

Figure 2:
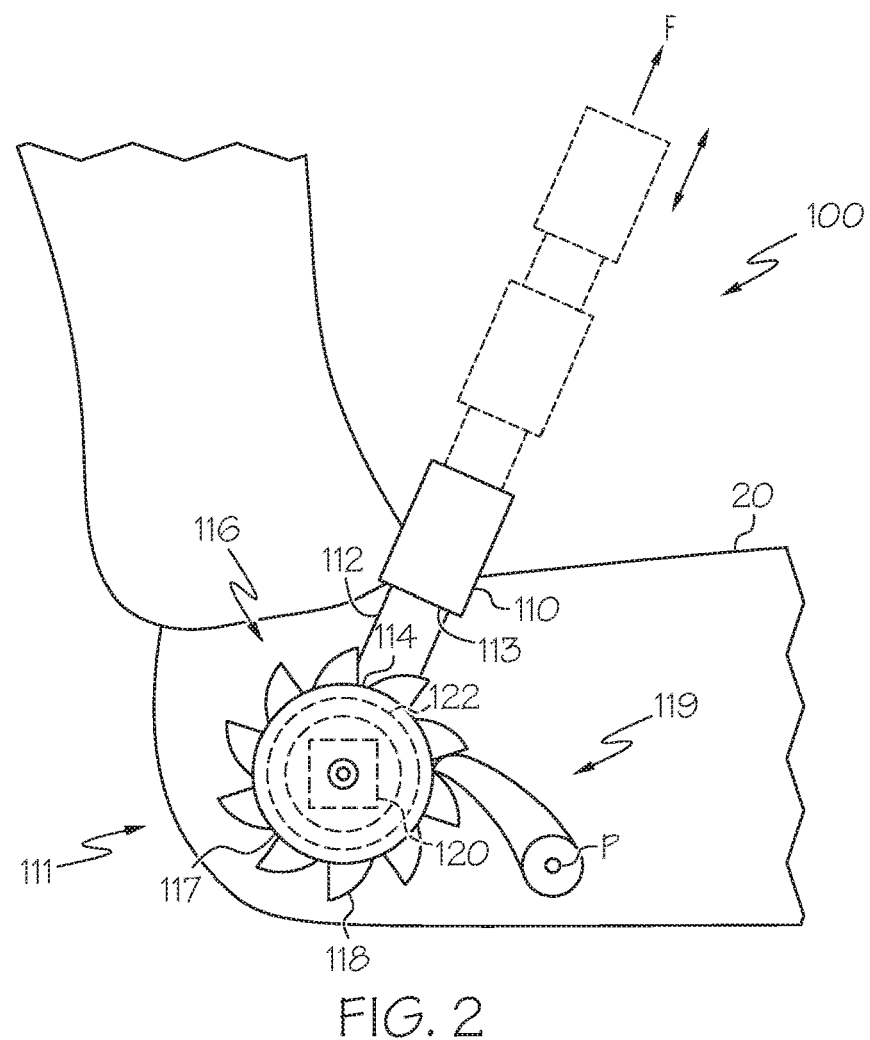
FIG. 2 schematically illustrates a block diagram of an illustrative vehicle seat belt system according to one or more embodiments shown and described herein.

FIG. 2 schematically illustrates a seat 20 including a seat belt system 100. In the illustrated embodiment, the seat belt system 100 includes the retractable seatbelt buckle 110 and an extension/retraction mechanism 111. It is noted that the extension/retraction mechanism 111 may be any device capable of facilitating motion of the retractable seatbelt buckle 110 between the extended position and the retracted position.

For example, the extension/retraction mechanism 111 may include a tether 112. The tether 112 may include a first end 113 coupled to the retractable seat belt buckle 110 and a second end 114 operatively coupled to a feed mechanism 116 (e.g., a ratchet retractor). The feed mechanism 116 may accommodate feed out of the tether 112 in response to a pulling force, F, applied to the retractable seat belt buckle 110 or tether 112. For example, the feed mechanism 116 may include a spring-loaded roller 117 (e.g., roller having a constant force spring 122 attached thereto) configured to wind the tether 112 around the spring-loaded roller 117 to move the retractable seat belt buckle 110 to the retracted position.

In some embodiments, the feed mechanism 116 accommodate movement of the retractable seat belt buckle 110 through a plurality of predetermined extended positions and temporarily lock the tether 112 from retraction at each of the plurality of predetermined extended positions. For example, the spring loaded roller 117 (or ratchet) may include a plurality of projections 118 (e.g., teeth) and a latch 119 (e.g., a pawl) may engage the roller 117 between the plurality of projections 118 to hold the roller 117 at a particular radial position. The latch 119 may be pivotably coupled to a support structure (e.g., the seat 20) at a pivot point P. The latch 119 may be biased (e.g., spring biased) toward the roller 118 so as to engage the plurality of projections 118, thereby preventing movement (e.g., clockwise rotation) of the roller 118 that would otherwise retract the retractable seat belt buckle 110, while allowing rotation (e.g., counter clockwise rotation) of the roller 118 to extend the retractable seat belt. That is, when a vertical force, F, is applied to the tether 112, the latch 119 may be lifted or rotated about its pivot P from engagement with the plurality of projections 118 to allow for feed out of the tether 112.

In some embodiments, the feed mechanism 116 may retract the retractable seat belt buckle 110 via the tether 112 to the retracted position in response to a retraction activating pulling force applied to the retractable seat belt buckle 110 or tether 112. For example, in some embodiments, a pull force, or angle of pulling may temporarily release the latch 119 to allow the tether 112 to roll up (e.g., in a counter-clockwise rotation) and pull the retractable seat belt buckle 110 to the retracted position.

In other embodiments, the feed mechanism 116 may be a motorized roller configured to dole out and/or roll up the tether 112 in response to some user input. For example, a vehicle operator or seat occupant may provide input over, for example, a vehicle interaction system (e.g., touch screen, button, voice command, etc.) to cause to feed mechanism 116 to retract or extend the retractable seat belt buckle 110. In some cases, and as described in greater detail below, feed mechanism 116 may automatically retract when a seat belt tongue is inserted into the retractable seat belt buckle 110.

Figure 3:
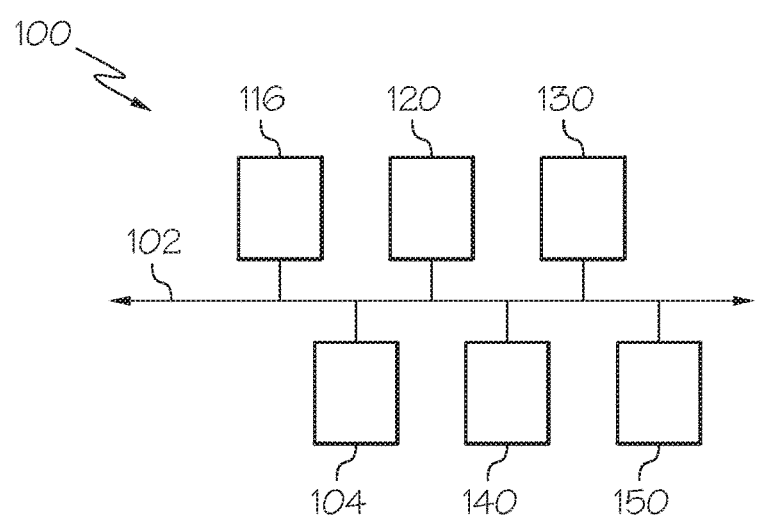
FIG. 3 illustrates a schematic side view of an illustrative vehicle seat in isolation according to one or more embodiments shown and described herein.

FIG. 3 schematically illustrates the vehicle seat belt system 100 to illustrate communication between various modules of the system. As noted above, the vehicle seat belt system 100 may be configured to provide notifications to a vehicle operator when the retractable seat belt buckle 110 is not returned to the retracted position. Accordingly, the vehicle seat belt system 100 may include a communication path 102, a control unit 104, one or more buckle sensors 120, one or more output devices 130, and one or more vehicle drive systems 150. In some embodiments, the system may further include the retraction/extension mechanism 111 and one or more tongue engagement sensors 140. It is noted the vehicle seat belt systems 100 may include a fewer or greater number of modules without departing from the scope of the present disclosure.

The various modules of the vehicle seat belt system 100 may be communicatively coupled to one another over the communication path 102. The communication path 102 may be a vehicle bus, such as, for example, a CAN bus or the like. The communication path 102 may be formed from any medium that is capable of transmitting a signal such as, for example, conductive wires, conductive traces, optical waveguides, or the like. Moreover, the communication path 102 may be formed from a combination of mediums capable of transmitting signals. In some embodiments, the communication path 102 includes a combination of conductive traces, conductive wires, connectors, and buses that cooperate to permit the transmission of electrical data signals between the various components of the components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The control unit 104 can be any type of computing device and includes one or more processors and one or more memory modules. The one or more processors may include any device capable of executing machine-readable instructions stored on a non-transitory computer-readable medium, such as those stored on the one or more memory modules. Accordingly, each of the one or more processors may include a controller, an integrated circuit, a microchip, a computer, and/or any other computing device.

The one or more memory modules of the control unit 104 are communicatively coupled to the one or more processors. The one or more memory modules may be configured as volatile and/or nonvolatile memory and, as such, may include random access memory (including SRAM. DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the control unit 104 and/or external to the control unit 104. The one or more memory modules may be configured to store logic (i.e., machine readable instructions) that, when executed by the one or more processors, allow the control unit 104 to output a warning indicative of the retractable seat belt buckle 110 being positioned in the extended position and/or prevent movement of the vehicle 10, as will be described in greater detail below.

As noted above, the vehicle seat belt system 100 includes one or more buckle sensors 120. The one or more buckle sensors 120 may be communicatively coupled to the control unit 104 via the communication path 102. The one or more buckle sensors 120 may be include any sensor capable of outputting a signal indicative of a position of the retractable seat belt buckle 110. For example, a buckle extended sensor may include a rotational sensor, a proximity sensor, an optical sensor, a distance sensor, an RFID sensor, or the like. The control unit 104 may receive the signal from the one or more buckle sensors 120 and determine a position of the retractable seat belt buckle 110 based on the signal from the one or more buckle sensors 120.

The one or more output devices 130 may be communicatively coupled to the control unit 104 over the communication path 102. The one or more output devices 130 may include one or more vehicle displays, audio systems, haptic feedback systems, and/or similar vehicle systems used for outputting information to a user within the vehicle 10. In such embodiments, when the control unit 104 determines, based on the signal from the one or more buckle sensors 120, that the retractable seat belt buckle 110 is in the extended position, the control unit 104 can output a warning signal (e.g., visual warning, auditory warning, haptic warning, etc.) to allow the vehicle operator to know that the retractable seat belt buckle 110 is in the extended position.

The one or more vehicle drive systems 150 may be communicatively coupled to the control unit 104 over the communication path 102. The one or more vehicle drive systems 150 may each include any system that facilitates motion of the vehicle 10. For example, the one or more vehicle drive systems 150 may include, but are not limited to, a steering system, a propulsion system, a gear shifter, a braking system, or the like. In various embodiments, the control unit 104 may transmit a stop signal to the one or more vehicle drive systems 150 to prevent motion of the vehicle 10 when the control unit 104 determines that the retractable seat belt buckle 110 is positioned in the extended position based on the signal from the one or more buckle sensors 120. Such communication may ensure that the retractable seat belt buckle 110 is placed in the retracted position prior to operation of the vehicle 10.

In some embodiments, and as noted above, the feed mechanism 116 may be motorized. In such embodiments, the control unit 104 may be communicatively coupled to the feed mechanism 116 over the communication path 102. In such embodiments, the control unit 104 may be configured to automatically retract the retractable seat belt buckle 110 to the retracted position. For example, the one or more tongue engagement sensors 140 may output a signal indicative of the tongue 162 having been inserted into the retractable seat belt buckle 110. The one or more tongue engagement sensors 140 may include any sensor configured to output a signal indicative of the seat belt tongue 162 being engaged with the retractable seat belt buckle 110. For example, such sensor(s) may include a pressure sensor, proximity sensor, optical sensor. RFID sensor, and/or the like.

The control unit 104 may receive the signal from the one or more tongue engagement sensors 140 and determine that the seat belt tongue 162 is inserted into the retractable seat belt buckle 110. In such embodiments, the control unit 104 may communicate with the feed mechanism 116 to automatically retract the retractable seat belt buckle 110 to the retracted position.

It should now be understood that embodiments as described herein are directed to vehicle seat belt systems. Such vehicle seat belt systems include a retractable seat belt buckle movable between an extended position and a retracted position, one or more buckle sensors, and a control unit. The one or more buckle sensors may be communicatively coupled to the control unit. The one or more buckle sensors output a signal indicative of the position of the retractable seat belt buckle. Using this signal, the control unit may determine a position of the retractable seat belt buckle. When the retractable seat belt buckle is determined to be in the extended position by the control unit, the control unit may transmit a stop signal to the one or more vehicle drive system to cause the one or more vehicle drive systems to prevent motion of the vehicle when the retractable seat belt buckle is positioned in the extended position. For example, when the retractable seat belt buckle is in the extended position, the control unit may prevent the vehicle from being placed in a driving gear (e.g., forward, reverse, low, etc.). This may ensure that the retractable seat belt buckle is positioned within a proper traveling position prior to the vehicle moving.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle seat belt system, comprising:
   a retractable seat belt buckle movable between an extended position and a retracted position;
   a buckle sensor positioned to sense a position of the retractable seat belt buckle and output a signal indicative of the position of the retractable seat belt buckle; and
   a control unit communicatively coupled to the buckle sensor and a drive system of a vehicle, wherein the control unit:
   receives the signal from the buckle sensor;
   determines the position of the retractable seat belt buckle based on the signal from the buckle sensor; and
   transmits a stop signal to the vehicle drive system to prevent motion of the vehicle when the retractable seat belt buckle is positioned in the extended position.

2. The vehicle seat belt system of claim 1, further comprising an extension/retraction mechanism comprising:
   a tether coupled to the retractable seat belt buckle; and
   a feed mechanism accommodating feed out of the tether in response to a pulling force applied to the retractable seat belt buckle or the tether, the feed mechanism facilitating movement of the retractable seat belt buckle through a plurality of predetermined extended positions and locking the tether from retraction at each of the plurality of predetermined extended positions.

3. The vehicle seat belt system of claim 2, wherein the feed mechanism retracts the retractable seat belt buckle via the tether to the retracted position in response to a retraction activating pulling force applied to the retractable seat belt buckle or the tether.

4. The vehicle seat belt system of claim 1, further comprising:
   a tether coupled to the retractable seat belt buckle; and
   a feed mechanism accommodating feed out of the tether in response to a pulling force applied to the retractable seat belt buckle or the tether and retraction of the retractable seat belt buckle in response to a retraction activating pulling force applied to the retractable seat belt buckle or the tether.

5. The vehicle seat belt system of claim 1, further comprising a seat belt tongue insertable into the retractable seat belt buckle.

6. The vehicle seat belt system of claim 1, further comprising one or more output devices communicatively coupled to the control unit, wherein the control unit transmits a warning signal to the one or more output devices that causes the one or more output devices to output a warning that the retractable seat belt buckle is in the extended position.

7. The vehicle seat belt system of claim 6, wherein the warning is at least one of a visual warning, an auditory warning, and a haptic warning.

8. A vehicle, comprising:
   a vehicle seat;
   a vehicle drive system; and
   a vehicle seat belt system comprising:
      a retractable seat belt buckle movable between an extended position and a retracted position;
      a buckle sensor positioned to sense a position of the retractable seat belt buckle and output a signal indicative of the position of the retractable seat belt buckle; and
      a control unit communicatively coupled to the buckle sensor and the drive system of a vehicle, wherein the control unit:
         receives the signal from the buckle sensor;
         determines the position of the retractable seat belt buckle based on the signal from buckle sensor; and
         transmits a stop signal to the vehicle drive system to prevent motion of the vehicle when the retractable seat belt buckle is positioned in the extended position.

9. The vehicle of claim 8, wherein the vehicle seat belt system further comprises an extension/retraction mechanism comprising:
   a tether coupled to the retractable seat belt buckle; and
   a feed mechanism accommodating feed out of the tether in response to a pulling force applied to the retractable seat belt buckle or the tether, the feed mechanism facilitating movement of the retractable seat belt buckle through a plurality of predetermined extended positions and locking the tether from retraction at each of the plurality of predetermined extended positions.

10. The vehicle claim 9, wherein the feed mechanism retracts the retractable seat belt buckle via the tether to the retracted position in response to a retraction activating pulling force applied to the retractable seat belt buckle or the tether.

11. The vehicle of claim 9, wherein the feed mechanism comprises a motorized roller.

12. The vehicle of claim 8, wherein the vehicle seat belt system further comprises an extension/retraction mechanism comprising:
   a tether coupled to the retractable seat belt buckle; and
   a feed mechanism accommodating feed out of the tether in response to a pulling force applied to the retractable seat belt buckle or the tether and retraction of the retractable seat belt buckle in response to a retraction activating pulling force applied to the retractable seat belt buckle or the tether.

13. The vehicle of claim 8, wherein the vehicle seat belt system further comprises a seat belt tongue insertable into the retractable seat belt buckle.

14. The vehicle claim 8, further comprising one or more output devices communicatively coupled to the control unit, wherein the control unit transmits a warning signal to the one or more output devices that causes the one or more output devices to output a warning that the retractable seat belt buckle is in the extended position.

15. The vehicle of claim 14, wherein the warning is at least one of a visual warning, an auditory warning, and a haptic warning.

* * * * *